(12) United States Patent
Ahn et al.

(10) Patent No.: US 10,530,006 B2
(45) Date of Patent: Jan. 7, 2020

(54) ELECTRODE ASSEMBLY FOR POLYMER SECONDARY BATTERY CELL

(71) Applicant: LG CHEM, LTD., Seoul (KR)

(72) Inventors: Chang Bum Ahn, Daejeon (KR); Ji Won Park, Daejeon (KR); Young Joo Yang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 295 days.

(21) Appl. No.: 14/493,783

(22) Filed: Sep. 23, 2014

(65) Prior Publication Data

US 2015/0064547 A1    Mar. 5, 2015

Related U.S. Application Data

(63) Continuation of application No. PCT/KR2014/002683, filed on Mar. 28, 2014.

(30) Foreign Application Priority Data

Aug. 29, 2013    (KR) .................. 10-2013-0103161

(51) Int. Cl.
*H01M 10/04* (2006.01)
*H01M 2/16* (2006.01)

(52) U.S. Cl.
CPC ... *H01M 10/0413* (2013.01); *H01M 10/0436* (2013.01); *H01M 2/166* (2013.01);
(Continued)

(58) Field of Classification Search
CPC ......... H01M 10/0404; H01M 10/0413; H01M 10/0436; H01M 2/166; H01M 2/168; H01M 2/1686
See application file for complete search history.

(56) References Cited

U.S. PATENT DOCUMENTS

| 6,287,720 B1 | 9/2001 | Yamashita et al. |
| 2002/0119367 A1 | 8/2002 | Watanabe et al. |

(Continued)

FOREIGN PATENT DOCUMENTS

| JP | 2000-3704 A | 1/2000 |
| JP | 2004-253144 A | 9/2004 |

(Continued)

OTHER PUBLICATIONS

International Search Report issued in PCT/KR2014/002683 dated Jul. 7, 2014.

(Continued)

*Primary Examiner* — Lingwen R Zeng
(74) *Attorney, Agent, or Firm* — Mintz Levin Cohn Ferris Glovsky and Popeo, P.C.; Steven M. Jensen; Joohee Lee

(57) ABSTRACT

The present invention relates to an electrode assembly, and more specifically to an electrode assembly for a polymer secondary battery cell, including a cell stack part defined by stacking at least one radical unit having a four-layered structure in which a first electrode, a first separator, a second electrode and a second separator are stacked in turn, wherein at least one of the first electrode and the second electrode has a size corresponding to 99.7% to 100% of a size of the first separator or the second separator and thus is aligned to be coincided with or close to an end of the first separator or the second separator.

13 Claims, 12 Drawing Sheets

(52) U.S. Cl.
CPC .......... *H01M 2/168* (2013.01); *H01M 2/1686* (2013.01); *H01M 10/0404* (2013.01)

(56) References Cited

U.S. PATENT DOCUMENTS

| | | | |
|---|---|---|---|
| 2002/0160257 A1* | 10/2002 | Lee | H01M 6/46 |
| | | | 429/130 |
| 2005/0191545 A1* | 9/2005 | Bowles | H01M 2/0207 |
| | | | 429/127 |
| 2005/0284750 A1 | 12/2005 | Nishimura et al. | |
| 2006/0035152 A1 | 2/2006 | Nishimura et al. | |
| 2006/0099493 A1 | 5/2006 | Nishimura et al. | |
| 2006/0115718 A1* | 6/2006 | Parsian | H01M 10/0525 |
| | | | 429/152 |
| 2008/0274394 A1 | 11/2008 | Schormann et al. | |
| 2009/0197162 A1* | 8/2009 | Shinyashiki | H01M 2/22 |
| | | | 429/161 |
| 2010/0190081 A1* | 7/2010 | Park | H01M 2/206 |
| | | | 429/452 |
| 2011/0045338 A1* | 2/2011 | Bae | H01M 2/1646 |
| | | | 429/144 |
| 2011/0064991 A1 | 3/2011 | Ahn | |
| 2011/0135987 A1 | 6/2011 | Shin | |
| 2011/0135998 A1 | 6/2011 | Ahn | |
| 2011/0244304 A1* | 10/2011 | Shinyashiki | H01M 2/16 |
| | | | 429/139 |
| 2012/0208066 A1 | 8/2012 | Schaefer et al. | |
| 2014/0023908 A1 | 1/2014 | Ueki et al. | |
| 2016/0056438 A1 | 2/2016 | Kim et al. | |

FOREIGN PATENT DOCUMENTS

| | | |
|---|---|---|
| JP | 2005-63776 A | 3/2005 |
| JP | 2008-021443 A | 1/2008 |
| JP | 2008-300141 A | 12/2008 |
| JP | 2011-505663 A | 2/2011 |
| JP | 2011-124220 | 6/2011 |
| KR | 10-2011-0030395 A | 3/2011 |
| KR | 10-2011-0064689 A | 6/2011 |
| KR | 10-2011-0065341 A | 6/2011 |
| WO | WO 97/31400 A1 | 8/1997 |
| WO | WO 2012/131883 A1 | 10/2012 |

OTHER PUBLICATIONS

Written Opinion of the International Searching Authority issued in PCT/KR2014-002683 dated Jul. 7, 2014.
Extended European Search Report dated Aug. 5, 2015, for European Application No. 14766092.2.

* cited by examiner

ELECTRODE ASSEMBLY FOR POLYMER SECONDARY BATTERY CELL

CROSS-REFERENCE TO RELATED APPLICATIONS

This application is a Continuation of PCT International Application No. PCT/KR2014/002683, filed on Mar. 28, 2014, which claims priority of Korean Patent Application No. 10-2013-0103161 filed on Aug. 29, 2013, in the Korean Intellectual Property Office, the disclosure of which is incorporated herein by reference.

BACKGROUND OF THE INVENTION

Field of the Invention

The present invention relates to an electrode assembly for a polymer secondary battery cell, and more particularly, to an electrode assembly for a polymer secondary battery cell, which is a new type of electrode assembly manufactured by only a stacking process without a folding process and in which electrodes are aligned with or close to a separator.

Description of the Related Art

Secondary batteries may be variously classified according to a structure of an electrode assembly. For example, the secondary batteries may be classified into a stacking type structure, a winding type (jelly-roll type) structure and a stacking/folding type structure.

Here, in the stacking type structure, a cathode, a separator and an anode are cut in predetermined sizes and then stacked in turn, thereby defining an electrode assembly. At this time, the separator is disposed between every cathode and anode.

In the winding type structure, the cathode, the separator, the anode and the separator are provided in sheet shapes, stacked in turn and then wound, thereby defining the electrode assembly.

In the stacking/folding type structure, a full cell or a bi-cell is provided and wound through a separator sheet, thereby defining the electrode assembly. The cathode, the separator and the anode are cut in predetermined sizes and then stacked in turn, and thus the full cell or the bi-cell may be provided (the full cell or the bi-cell includes one or more cathodes, separators and anodes).

However, in the stacking type structure, since an electrode unit (the cathode, the separator and the anode) defining the electrode assembly are separately stacked, precise alignment of the electrode assembly is very difficult, and too many processes are required to produce the electrode assembly. And in the stacking/folding type structure, since two lamination apparatuses and one folding apparatus are required, a manufacturing process of the electrode assembly is very complicated. Particularly, in the stacking/folding type structure, since the full cell or the bi-cell is stacked through a folding process, precise alignment of the full cell or the bi-cell is difficult.

Recently, in order to remedy these limitations, a new manufacturing method which may manufacture the electrode assembly by only a stacking process, may precisely align the electrode assembly, and also may improve productivity thereof has been proposed by the applicant (Patent document 1).

Here, referring to FIG. 1, in a typical stacking type electrode assembly, each of a first polar electrode 14 and a second polar electrode 12 has a much smaller size than that of a separator 16, and the separator 16 is moved between the first and second polar electrodes 14 and 12, and regular alignment is impossible, and thus there is a limitation in stability. And thus a separate alignment process has to be additionally performed in order to overcome the limitation.

SUMMARY OF THE INVENTION

Accordingly, the present invention aims at providing an electrode assembly for a polymer secondary battery cell, in which electrodes are aligned with or close to a separator, and it is possible to regularly align the electrodes and the separator and thus secure stability, and also an electrode capacity may be increased.

According to an aspect of the present invention, there is provided an electrode assembly, and more specifically an electrode assembly for a polymer secondary battery cell, including a cell stack part defined by stacking at least one radical unit having a four-layered structure in which a first electrode, a first separator, a second electrode and a second separator are stacked in turn, wherein at least one of the first electrode and the second electrode has a size corresponding to 99.7% to 100% of a size of the first separator or the second separator and thus is aligned with or close to an end of the first separator or the second separator.

At least one of the first electrode and the second electrode may be defined so that one of a width and a length thereof is the same as that of the first separator or the second separator, and the other one is the same as or smaller than that of the first separator or the second separator.

According to another aspect of the present invention, there is provided an electrode assembly, and more specifically an electrode assembly for a polymer secondary battery cell, including a cell stack part defined by stacking at least one radical unit having a four-layered structure in which a first electrode, a first separator, a second electrode and a second separator are stacked in turn, wherein at least one of the first electrode and the second electrode has a width or a length which is smaller by 0 to 0.3 mm than that of the first separator or the second separator, and thus is aligned with or close to an end of the first separator or the second separator.

The cell stack part may further include a first auxiliary unit which is stacked on a first terminal electrode as the first electrode disposed at the uppermost side or the lowermost side thereof, and when the first electrode is a cathode and the second electrode is an anode, the first auxiliary unit may be defined by stacking the separator, the anode, the separator and the cathode in turn from the first terminal electrode, and when the first electrode is the anode and the second electrode is the cathode, the first auxiliary unit may be defined by stacking the separator and the cathode in turn from the first terminal electrode.

The cell stack part may further include a first auxiliary unit which is stacked on a second terminal separator as the second separator disposed at the uppermost side or the lowermost side thereof, and when the first electrode is a cathode and the second electrode is an anode, the second auxiliary unit may be defined as the cathode, and when the first electrode is the anode and the second electrode is the cathode, the second auxiliary unit may be defined by stacking the anode, the separator and the cathode in turn from the second terminal separator.

According to the present invention, since the electrodes are aligned with or close to a separator, it is possible to more easily stack the electrodes and the separator and thus increase stability, and also an electrode capacity may be increased, and marketability of the electrode assembly may be increased.

DETAILED DESCRIPTION OF THE PREFERRED EMBODIMENT

Figure 1:
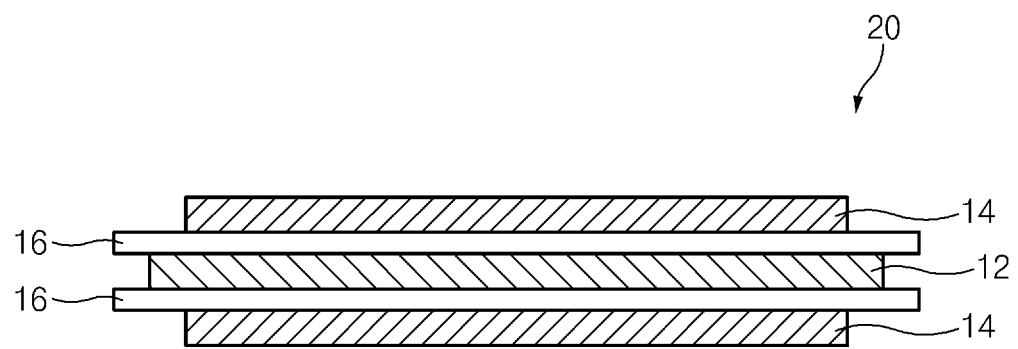
FIG. 1 is a view illustrating a typical electrode assembly having a stacking structure.

An electrode assembly for a polymer secondary battery cell according to the present invention includes a cell stack part having at least one stacked radical unit in which a first electrode, a first separator, a second electrode and a second separator are stacked, in turn, in a four-layered structure. A size of each electrode is arranged to be the same as or similar to that of the separator, and thus marketability is enhanced due to an increase in stacking efficiency and capacity.

Hereinafter, preferred examples of the present invention will be described in detail with reference to the accompanying drawings. Since the embodiments of the present invention are for describing the detailed descriptions of the present invention, it is not intended to limit the scope of right. The same reference numerals are given to the same or corresponding parts, and the description thereof will not be repeated.

[Electrode Assembly for Polymer Secondary Battery Cell According to a First Embodiment of the Present Invention]

An electrode assembly for a polymer secondary battery cell according to a first embodiment of the present invention includes a cell stack part, and the cell stack part has at least one stacked radical unit, and the radical unit is defined by stacking a first electrode, a first separator, a second electrode and a second separator in turn.

Hereinafter, the electrode assembly for the polymer secondary battery cell according to the first embodiment of the present invention will be described more fully.

Figure 2:
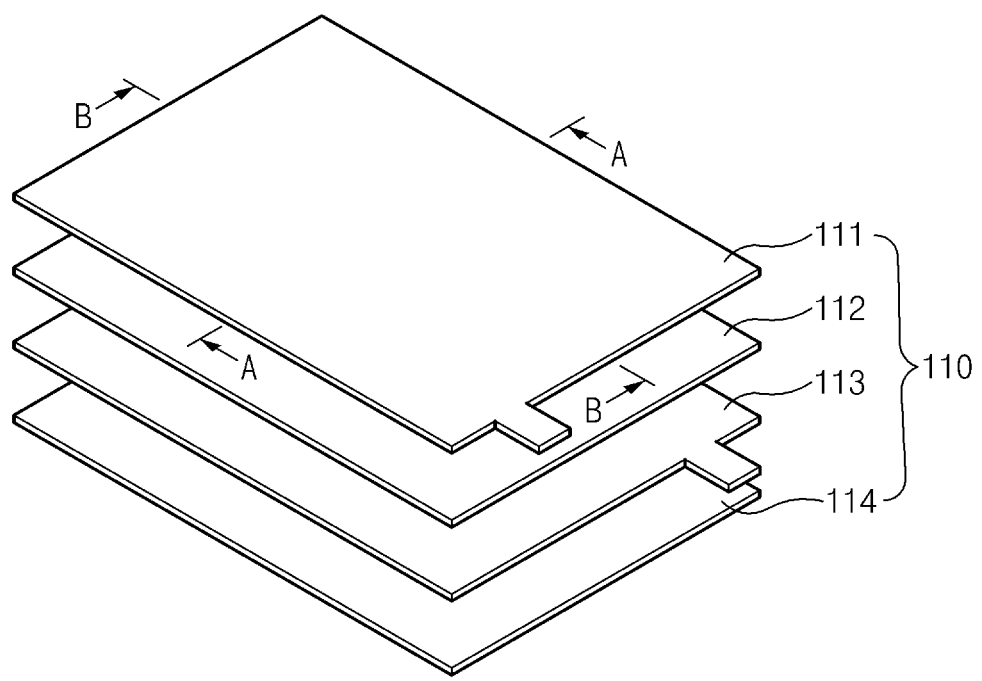
FIG. 2 is an exploded perspective view illustrating a first structure of an electrode assembly for a polymer secondary battery cell according to the present invention.
Figure 3:
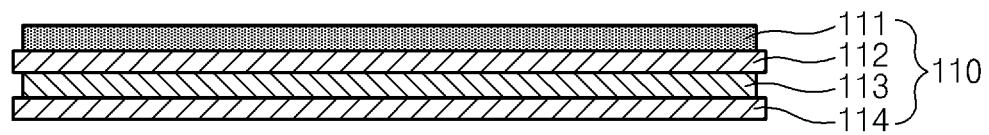
FIG. 3 is a transverse cross-sectional view in an assembled state of the electrode assembly for the polymer secondary battery cell according to the present invention.
Figure 4:
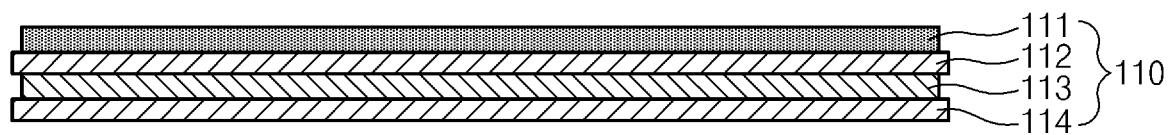
FIG. 4 is a longitudinal cross-sectional view in the assembled state of the electrode assembly for the polymer secondary battery cell according to the present invention.

As illustrated in FIGS. 2 to 4, a first structure of the radical unit 110 is defined by stacking the first electrode 111, the first separator 112, the second electrode 113 and the second separator 114 in turn. As described above, the radical unit 110 fundamentally has a four-layered structure.

That is, as illustrated in FIGS. 2 to 4, the radical unit 110 is defined by stacking the first electrode 111, the first separator 112, the second electrode 113 and the second separator 114, in turn, from an upper side toward a lower side. At this time, the first electrode 111 and the second electrode 113 have opposite polarities to each other. For example, if the first electrode 111 is a cathode, the second electrode 113 is an anode. Of course, these polarities may be reversed.

Here, at least one of the first and second electrodes 111 and 113 has a size corresponding to 99.7% to 100% of a size of the first separator 112 or the second separator 114, and thus is aligned to be coincided with or close to the end of the first separator 112 or the second separator 114.

Therefore, there is hardly a difference between transverse lengths of the first and second electrodes 111 and 113 and transverse lengths of the first and second separators 112 and 114 (referring to FIG. 3), and also there is hardly a difference between longitudinal lengths of the first and second electrodes 111 and 113 and longitudinal lengths of the first and second separators 112 and 114 (referring to FIG. 4).

Therefore, when the first electrode 111, the first separator 112, the second electrode 113 and the second separator 114 are stacked, the radical unit 110 may be regularly aligned without a separate arranging process. The first and second electrodes 111 and 113 are prevented from being moved, and thus it is possible to secure stability. Further, performance of the electrode assembly may be enhanced due to an increase in capacities of the first and second electrodes 111 and 113.

Meanwhile, although not illustrated in the accompanying drawings, in the radical unit 110, the first electrode 111 or the second electrode 113 may be provided to have a size corresponding to 99.7% to 100% of the size of the first separator 112 or the second separator 114, and this may be applied when one of the first electrode 111 and the second electrode 113 needs the increase in capacity or alignment.

Here, if the size of the first electrode 111 or the second electrode 113 has a size corresponding to 99.6% or less of the first separator 112 or the second separator 114, the first electrode 111 or the second electrode 113 is moved in the first separator 112 and the second separator 114, and thus the separate arranging process should be performed.

Further, if the size of the first electrode 111 or the second electrode 113 has a size corresponding to 100% or more of the first separator 112 or the second separator 114, trouble may occur due to a contact between the first and second electrodes 111 and 113.

Further, although not illustrated in the accompanying drawings, in the radical unit 110, at least one of the first electrode 111 and the second electrode 113 may be defined so that one of the width and the length thereof is the same as that of the first separator 112 or the second separator 114, and the other one is smaller than that of the first separator 112 or the second separator 114.

That is, in the radical unit 110, only one of the width and the length of the first electrode 111 or the second electrode 113 is increased to be the same as that of the first separator 112 or the second separator 114, and thus the first electrode 111 or the second electrode 113 may be regularly aligned with the first separator 112 or the second separator 114 through one increased side thereof.

Therefore, the radical unit 110 is defined by stacking the first electrode 111, the first separator 112, the second electrode 113 and the second separator 114 in turn, such that at least one of the first and second electrodes 111 and 113 has the size corresponding to 99.7% to 100% of the size of the first separator 112 or the second separator 114. Therefore, it is possible to improve the alignment, the increase in capacity and the stability.

A cell stack part 100 is defined by stacking at least one radical unit 110 having the above-mentioned structure.

Figure 7:
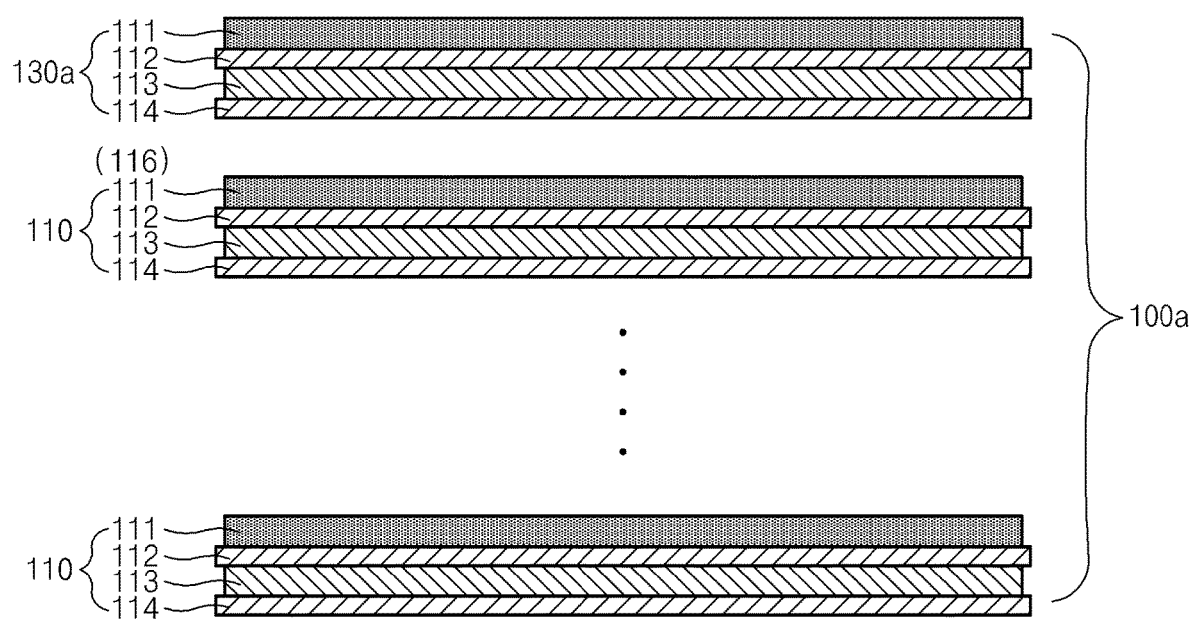
FIG. 7 is a side view illustrating a first structure of a cell stack part including a radical unit and a first auxiliary unit according to the present invention.

That is, as illustrated in FIG. 7, the cell stack part 100 includes at least one radical unit 110. In other words, the cell stack part 100 is configured with at least one radical unit 110 or at least two radical units 110, and the cell stack part 100 is defined by stacking the radical unit 110.

For example, the cell stack part 100 may be defined by stacking one radical unit 110 on another radical unit 110. In such a way, the cell stack part 100 is defined by stacking the radical unit 110 as a radical unit. That is, the radical unit 110 is previously prepared and then stacked in turn, thereby providing the cell stack part 100.

The cell stack part 100 according to the embodiment is fundamentally characterized by being defined by repeatedly stacking the radical unit 110. If the cell stack part 100 is defined in such a manner, the radical unit 110 may be precisely aligned, and also productivity may be enhanced.

Figure 5:
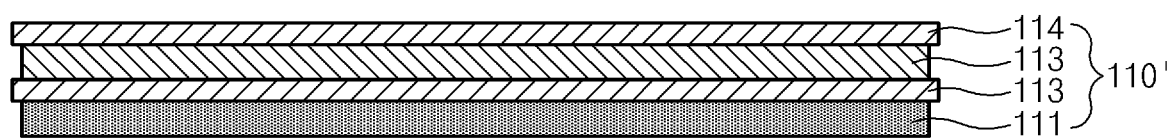
FIG. 5 is a view illustrating a second structure of the electrode assembly for the polymer secondary battery cell according to the present invention.

Meanwhile, as illustrated in FIG. 5, a second structure of radical unit 110' may be defined by stacking a first electrode 111, a first separator 112, a second electrode 113 and a second separator 114, in turn, from a lower side toward an upper side.

Here, at least one of the first and second electrodes 111 and 113 has a size corresponding to 99.7% to 100% of the size of the first separator 112 or the second separator 114 so as to be with or close to an end of the first separator 112 or the second separator 114.

Meanwhile, the second structure of the radical unit 110' has the same configuration as that of the first structure of the radical unit 110, except stacking order of the first electrode 111, the first separator 112, the second electrode 113 and the second separator 114, and thus description thereof will be omitted.

And a cell stack part 100' is defined by stacking at least one radical unit 110' having the above-mentioned structure.

Figure 11:
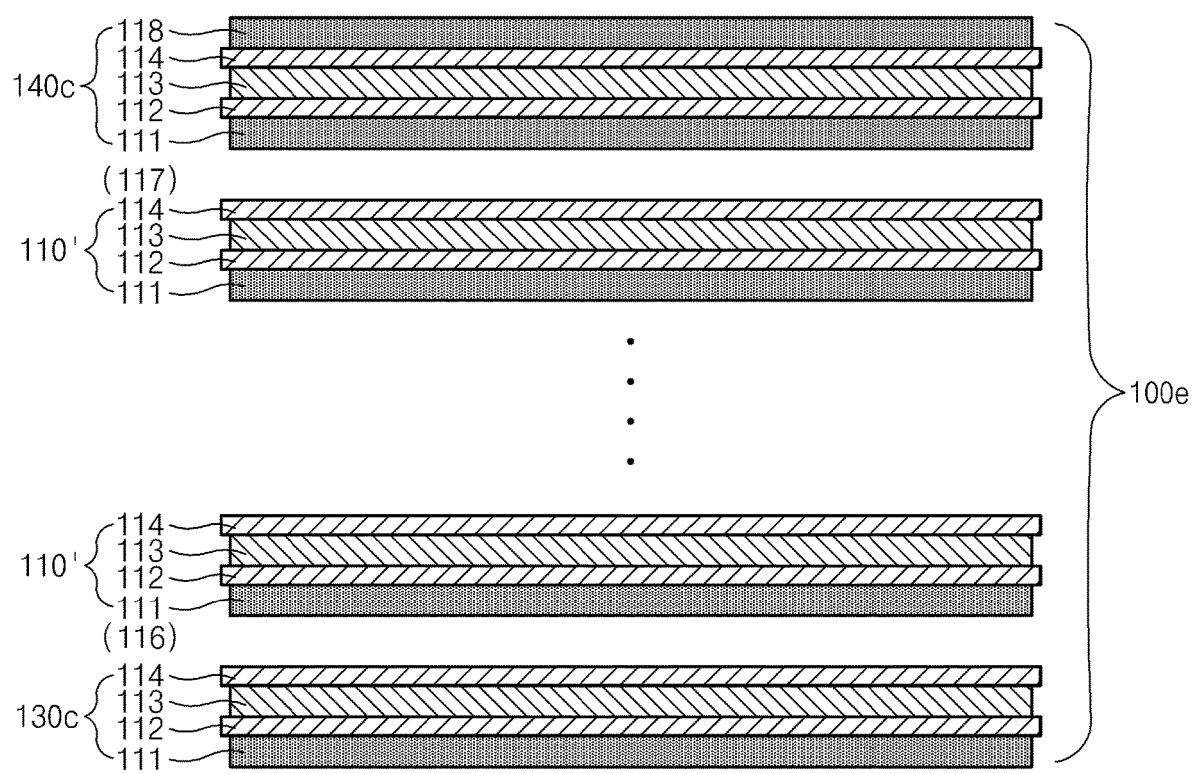
FIG. 11 is a side view illustrating a fifth structure of the cell stack part including the radical unit, the first auxiliary unit and the second auxiliary unit according to the present invention.

That is, as illustrated in FIG. 11, the cell stack part 100' includes the at least one radical unit 110'. In other words, the cell stack part 100' is configured with at least one radical unit 110' or at least two radical units 110'.

[Electrode Assembly for Polymer Secondary Battery Cell According to a Second Embodiment of the Present Invention]

Meanwhile, in an electrode assembly for polymer secondary battery cell according to a second embodiment of the present invention, at least one of the first electrode 111 or the second electrode may have a width or a length which is smaller by 0 to 0.3 mm than that of the first separator 112 or the second separator 114, and thus is aligned to be coincided with or close to the end of the first separator 112 or the second separator 114. Here, the electrode assembly for polymer secondary battery cell according to the second embodiment of the present invention has the same configuration and effect as those in the electrode assembly for polymer secondary battery cell according to the first embodiment of the present invention, except a unit thereof, and thus detailed description thereof will be omitted.

[Manufacturing Process of Radical Unit]

Figure 6:
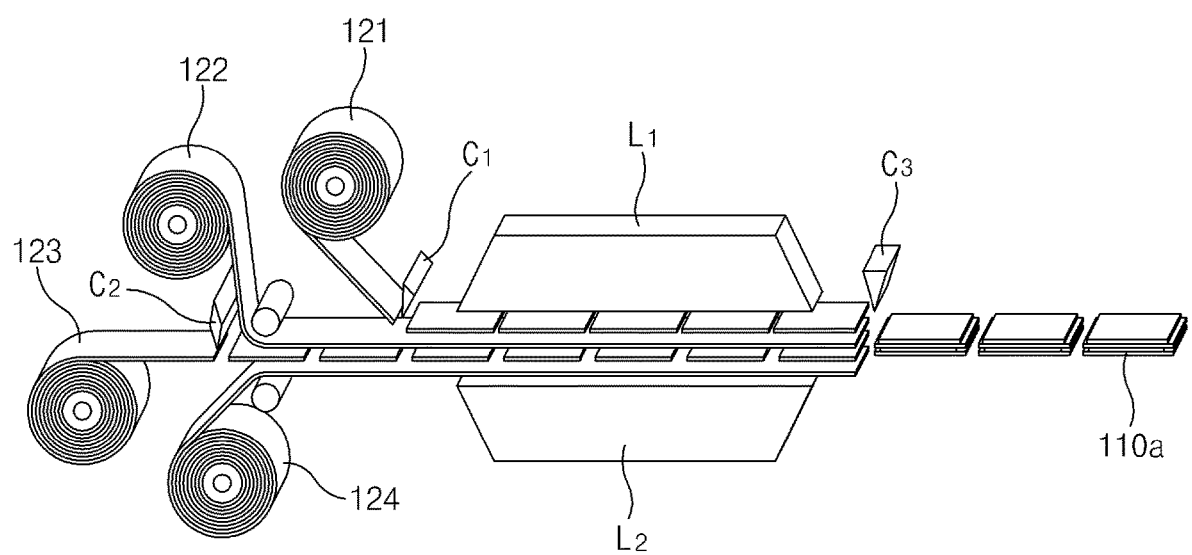
FIG. 6 is a process drawing illustrating a manufacturing process of the electrode assembly for the polymer secondary battery cell according to the present invention.

The radical unit 110 having the above-mentioned stacking structure may be provided by the following process (referring to FIG. 6).

First of all, a first electrode material 121, a first separator material 122, a second electrode material 123 and a second separator material 124 are prepared. Here, the electrode materials 121 and 123 are cut in predetermined sizes so as to provide the electrodes 111 and 113. The separator materials 122 and 124 are also processes in the same manner. For process automation, the electrode materials and the separator materials may be provided in a state of being wound on each roll. After the materials are prepared in this manner, the first electrode material 121 is cut in a predetermined size through a cutter C1. And the second electrode material 123 is also cut in a predetermined size through a cutter $C_2$. Then, the first electrode material 121 having the predetermined size is supplied on the first separator material 122. And the second electrode material 123 having the predetermined size is also supplied on the second separator material 124. The all of the materials are supplied to laminators $L_1$ and $L_2$.

As described above, the cell stack part 100 is defined by repeatedly stacking the radical unit 110. However, if the electrode and the separator defining the radical unit 110 are separated from each other, it is very difficult to repeatedly stack the radical unit 110. Therefore, when the radical unit 110 is defined, the electrode and the separator may be adhered to each other. The laminators L1 and L2 are provided to adhere the electrode and the separator to each other. That is, the laminators L1 and L2 apply pressure or pressure and heat to the materials and adheres the electrode material and the separator material. Like this, the electrode material and the separator material are adhered by the laminators L1 and L2. Therefore, the radical unit 110 may stably maintain its own shape.

Finally, the first separator material 122 and the second separator material 124 are cut in predetermined sizes by a cutter C3. The radical unit 110 may be defined by this cutting process. If necessary, various inspections with respect to the radical unit 110 may be performed additionally. For example, a thickness inspection, a vision inspection, a short inspection or the like may be additionally performed.

Meanwhile, the separator (the separator material) may be coated with a coating material having adhesive force. At this time, the coating material may be a mixture of inorganic particles and a binder polymer. Here, the inorganic particles may serve to improve thermal stability of the separator. That is, the inorganic particles prevent the separator from being contracted at a high temperature, and the binder polymer may serve to fix the inorganic particles. Due to the inorganic particles, a predetermined pore structure may be provided on a surface of the separator. Therefore, even though the inorganic particles are coated on the separator, ions may be smoothly moved from a cathode to an anode due to the pore structure. Further, the binder polymer may stably keep the inorganic particles on the separator and thus may enhance mechanical stability of the separator. Furthermore, the binder polymer may further stably adhere the separator to the electrode (this coating is referred to as an SRS coating). For reference, the separator may be formed of a polyolefin-based separator material.

However, as illustrated in FIGS. 2 and 5, the electrodes 111 and 113 are disposed on both surfaces of the first separator 112, but the electrode 113 is disposed on only one surface of the second separator 114. Therefore, the coating material may be coated on the both surfaces of the first separator 112, and coating material may be coated on only one surface of the second separator 114. That is, in the first separator 112, the coating material may be coated on the both surface facing the first and second electrodes 111 and 113, and in the second separator 114, the coating material may be coated on the only one surface facing the second electrode 113.

As described above, it is sufficient only to perform the adhesion using the coating material in the radical unit. Therefore, as described above, the coating may be achieved on the only one surface of the second separator 114. However, since the adhesion may be achieved between the radical units by heat press or the like, if necessary, the coating may be achieved on the both surface of the second separator 114. That is, the coating material may be coated on one surface of the second separator 114 facing the second electrode 113 and the other surface thereof. In this case, the upper radical unit and the lower radical unit may be adhered to each other through the coating material coated on the outer surface of the second separator.

For reference, in the case in which the coating material having the adhesive force is coated on the separator, it is not preferable to directly press the separator using a desired object. The separator is typically more extended to an outside than the electrode. Therefore, it may be attempted to couple an end of the first separator 112 and an end of the second separator 114. For example, it may be attempted to couple the end of the first separator 112 and the end of the second separator 114 in an ultrasonic adhering manner. However, in the ultrasonic adhering, it is necessary to directly pressure the target object using a horn. However, if the end of the separator is directly pressed by the horn, the horn may be adhered to the separator due to the coating material having the adhesive force, and thus a trouble in the device may occur. When the coating material having the adhesive force is coated on the separator, it is not preferable to directly press the separator using the desired object.

In addition, the radical unit 110 does need to have the four-layered structure. For example, the radical unit 110 may have an eight-layered structure in which the first electrode 111, the first separator 112, the second electrode 113, the second separator 114, the first electrode 111, the first separator 112, the second electrode 113 and the second separator 114 are stacked in turn. That is, the radical unit 110 may have the eight-layered structure which is defined by repeatedly stacking the radical unit 110. As described above, the cell stack part 100 is defined by repeatedly stacking the radical units 110. Therefore, the cell stack part 100 may be defined by repeatedly stacking the four-layer structure, and may also be defined by repeatedly stacking, for example, the eight-layer structure.

[Electrode Assembly for Polymer Secondary Battery Cell According to Another Embodiment of the Present Invention]

Meanwhile, a cell stack part 100a may further include at least one of a first auxiliary unit 130 and a second auxiliary unit 140. Firstly, the first auxiliary unit 130 will be described. The radical unit 110 is defined by stacking the first electrode 111, the first separator 112, the second electrode 113 and the second separator 114, in turn, from the upper side to the lower side or from the lower side to the upper side. Therefore, if the cell stack part 100 is defined by repeatedly stacking the radical unit 110, the first electrode 116 (hereinafter, called "first terminal electrode") is disposed at the uppermost side (referring to FIG. 7) of the cell stack part 100 or the lowermost side (referring to FIG. 11) thereof (the first terminal electrode may be a cathode or an anode.). As described above, the first auxiliary unit 130 is additionally stacked on the first terminal electrode 116.

Here, the sizes of the first and second electrodes 111 and 113 may be arranged to be the same as or similar to that of the separator, and thus the alignment characteristic and stability of the first auxiliary unit 130 may be secured.

FIG. 7 is a side view illustrating a first structure of the cell stack part including the radical unit and the first auxiliary unit according to the present invention.

More specifically, as illustrated in FIG. 7, the cell stack part 100a includes a first auxiliary unit 130a. When the first electrode 111 is the cathode and the second electrode 113 is the anode, the first auxiliary unit 130a is defined by stacking the separator 114, the anode 113, the separator 112 and the cathode 111, in turn, from the first terminal electrode 116, i.e., from the first terminal electrode 116 toward an outside thereof (an upper side of the FIG. 7).

Figure 8:
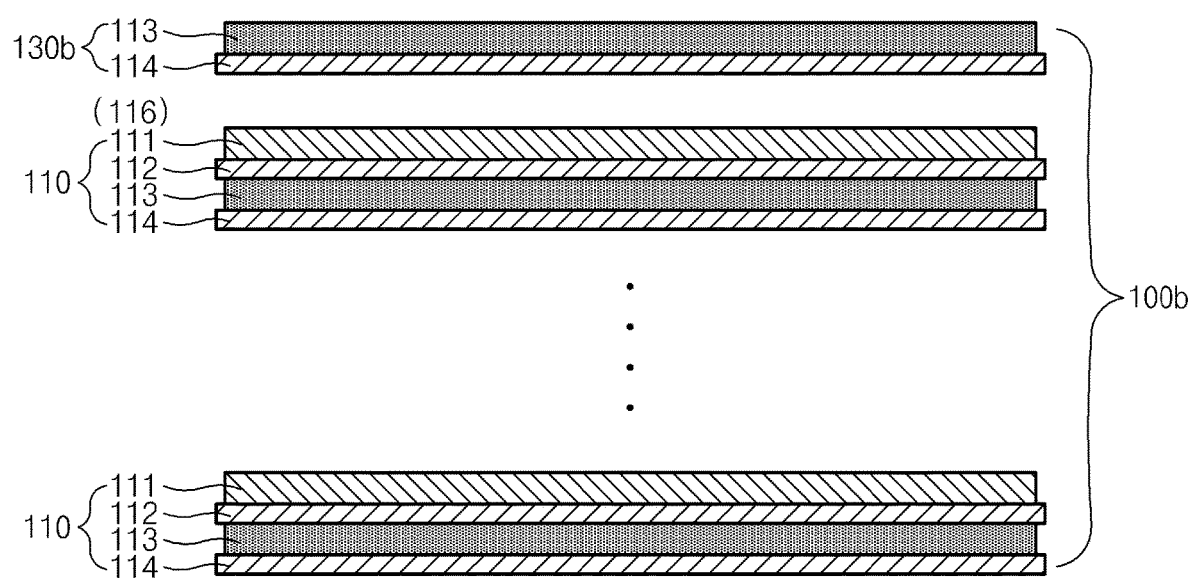
FIG. 8 is a side view illustrating a second structure of the cell stack part including the radical unit and the first auxiliary unit according to the present invention.

FIG. 8 is a side view illustrating a second structure of the cell stack part including the radical unit and the first auxiliary unit according to the present invention.

Further, as illustrated in FIG. 8, a cell stack part 100b may include a first auxiliary unit 130b. When the first electrode 111 is the anode and the second electrode 113 is the cathode, the first auxiliary unit 130b may be defined by stacking the separator 114 and the cathode 113, in turn, from the first terminal electrode 116, i.e., from the first terminal electrode 116 toward an outside thereof.

Therefore, in the cell stack part 100, referring to FIGS. 7 and 8, the cathode may be disposed at the outermost side of the first terminal electrode 116 by the first auxiliary unit 130.

Meanwhile, the electrode is generally configured with a collector and an active material layer (active material) which is coated on both surfaces of the collector. Therefore, the active material layer of the cathode active material layers, which is located at a lower side of the collector in FIG. 7, reacts with the active material layer of the anode active material layers, which is located at an upper side of the collector, through the separator. However, when the radical units 110 are defined equally and the cell stack part 100 is defined by stacking the radical units 110 in turn, the first terminal electrode disposed at the uppermost side or the lowermost side of the cell stack part 100 has to have the active material layers on the both surfaces of the collector, like in the first electrode. However, if the first terminal electrode has a structure in which the active material layer is coated on the both surfaces of the collector, the active material layer of the active material layers of the first terminal electrode, which is disposed at an outer side thereof, may not react with another active material layer. Therefore, the active material layer is wasted.

The first auxiliary unit 130 is to overcome this limitation. That is, the first auxiliary unit 130 is separately provided from the radical unit 110. Therefore, the first auxiliary unit 130 may have the cathode in which the active material layer is defined on only one surface of the collector. That is, the first auxiliary unit 130 may have the cathode in which the active material layer is coated on only one surface (facing downward in FIG. 7) of the both surfaces of the collector, which faces the radical unit 110. As a result, if the cell stack part 100 is defined by additionally stacking the first auxiliary unit 130 on the first terminal electrode 116, the cathode of which only one surface is coated may be disposed at the outermost side of the first terminal electrode 116. Therefore, the waste of the active material layer may be prevented. And since the cathode is a configuration for discharging (for example) nickel ions, it is advantageous to dispose the cathode at the outermost side.

Next, the second auxiliary unit 140 will be described.

The second auxiliary unit 140 basically performs the same functions as that of the second auxiliary unit 130. More specifically, the radical unit 110 is defined by stacking the first electrode 111, the first separator 112, the second electrode 113 and the second separator 114, in turn, from the upper side to the lower side or from the lower side to the upper side. Therefore, if the cell stack part 100 is defined by repeatedly stacking the radical unit 110, the second separator 117 (hereinafter, called "second terminal separator") is disposed at the uppermost side (referring to FIG. 11) of the cell stack part 100 or the lowermost side (referring to FIG. 9) thereof. As described above, the second auxiliary unit 140 is additionally stacked on the second terminal separator 117.

Here, the sizes of the first and second electrodes 111 and 113 may be arranged to be the same as or similar to that of the separator, and thus the alignment characteristic and stability of the second auxiliary unit 140 may be secured.

Figure 9:
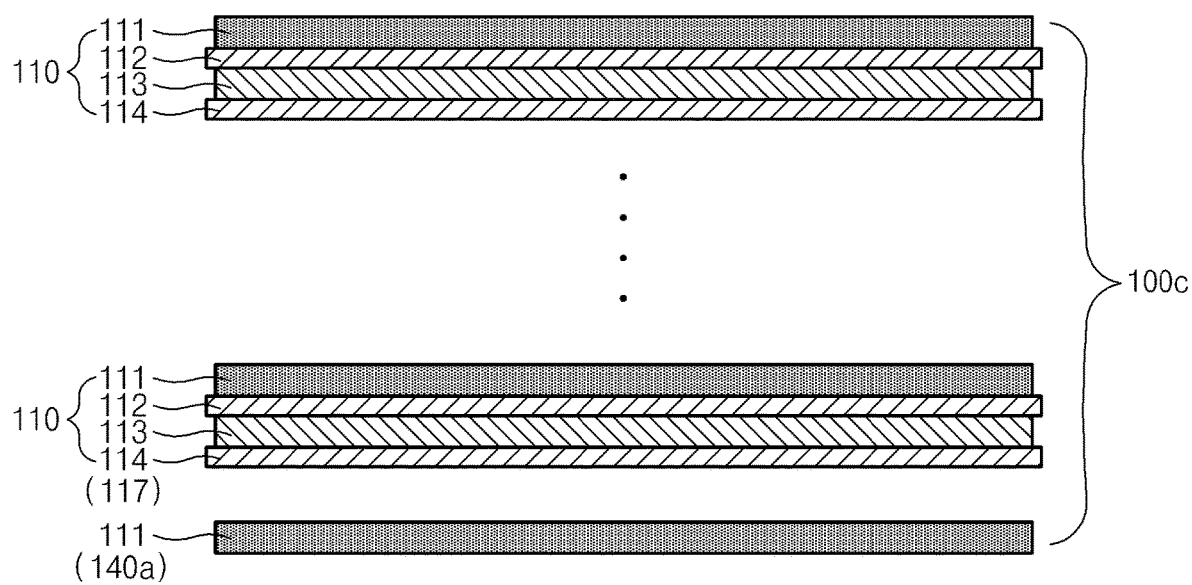
FIG. 9 is a side view illustrating a third structure of the cell stack part including the radical unit and a second auxiliary unit according to the present invention.

FIG. 9 is a side view illustrating a third structure of the cell stack part including the radical unit and a second auxiliary unit according to the present invention.

More specifically, as illustrated in FIG. 9, the cell stack part 100c may include a second auxiliary unit 140a. When the first electrode 111 is the cathode and the second electrode 113 is the anode, the first auxiliary unit 130a may be defined as the cathode 111.

Figure 10:
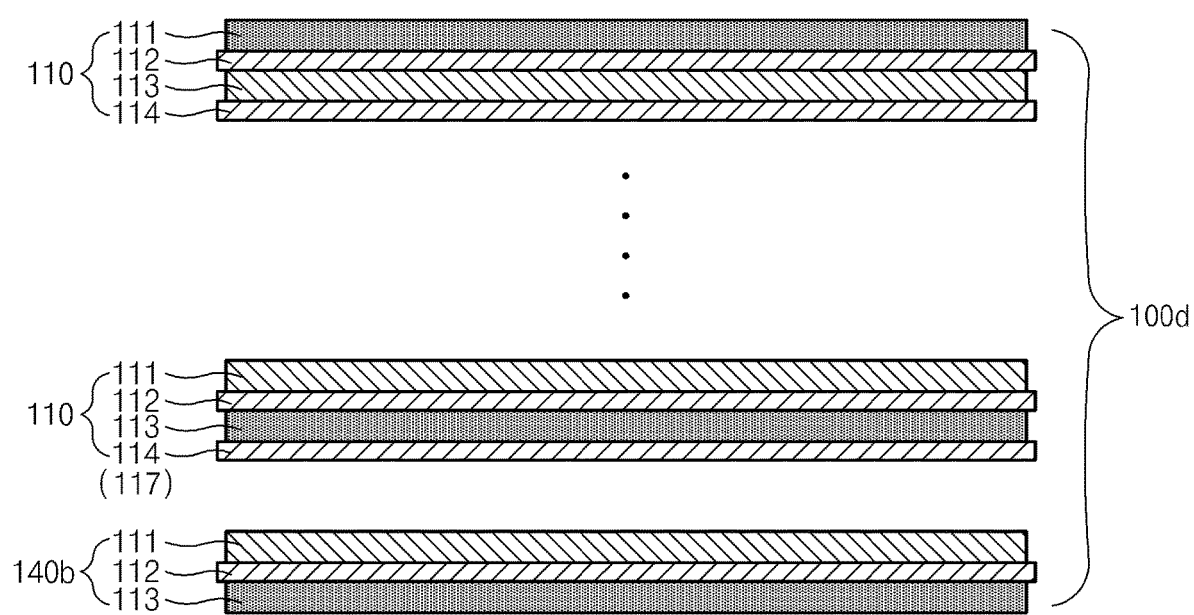
FIG. 10 is a side view illustrating a fourth structure of the cell stack part including the radical unit and the second auxiliary unit according to the present invention.

FIG. 10 is a side view illustrating a fourth structure of the cell stack part including the radical unit and the second auxiliary unit according to the present invention.

Further, as illustrated in FIG. 10, a cell stack part 100d may include a second auxiliary unit 140b. When the first electrode 111 is the anode and the second electrode 113 is the cathode, the second auxiliary unit 140b may be defined by stacking the separator 114 and the cathode 113, in turn, from the second terminal separator 117, i.e., from the second terminal separator 117 toward an outside thereof (the lower side of FIG. 10). Like the first auxiliary unit 130, the second auxiliary unit 140 may have the cathode in which the active material layer is coated on only one surface (facing upward in FIG. 10) of the collector. As a result, if the cell stack part 100 is defined by additionally stacking the second auxiliary unit 140 on the second terminal separator 117, the cathode of which only one surface is coated may be disposed at the outermost side of the second terminal separator 117.

For reference, FIGS. 7, 8, 9 and 10 illustrate the examples in which the first electrode 111, the first separator 112, the second electrode 113 and the second separator 114 are stacked in turn from the upper side to the lower side. On the contrary to this, the case in which the first electrode 111, the first separator 112, the second electrode 113 and the second separator 114 are stacked in turn from the lower side to the upper side may be described in the same manner. If necessary, the first auxiliary unit 130 and the second auxiliary unit 140 may further include the separator at the outermost sides thereof. As an example, when the cathode disposed at the outermost side needs to be electrically insulated from the case, the first auxiliary unit 130 and the second auxiliary unit 140 may further include the separator at the outermost sides the cathode. By the same token, as illustrated in FIG. 9, the separator may be further provided to the cathode which is exposed to an opposite side (i.e., the uppermost side of the cell stack part of FIG. 10) to the second auxiliary unit 140.

Figure 12:
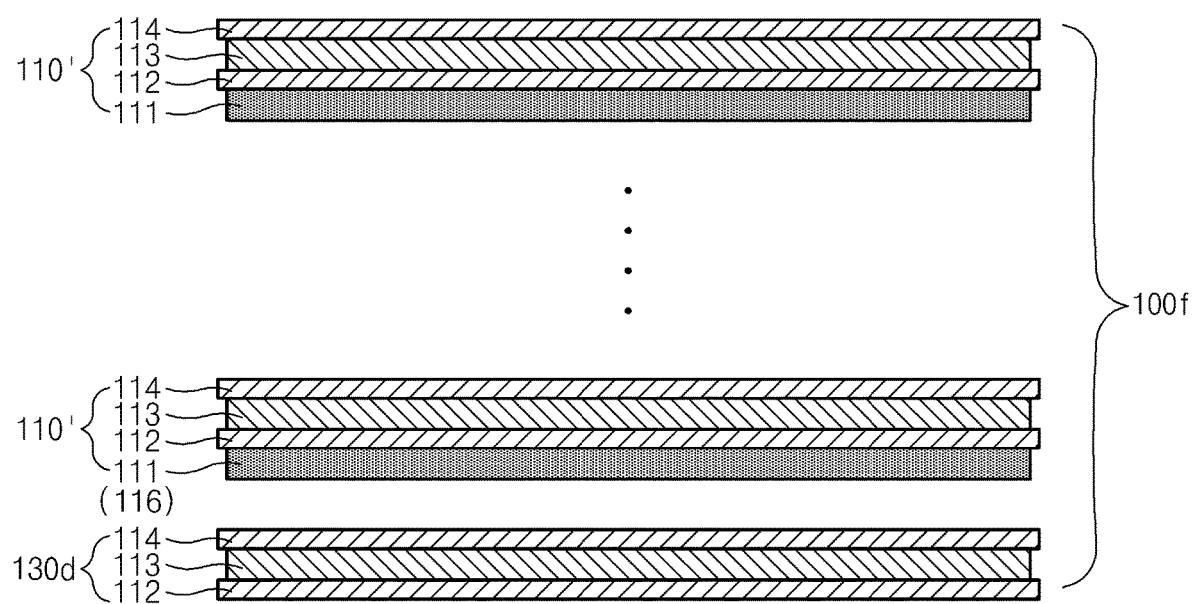
FIG. 12 is a side view illustrating a sixth structure of the cell stack part including the radical unit and the first auxiliary unit according to the present invention.

Meanwhile, the cell stack part may be defined as illustrated in FIGS. 11 and 12.

FIGS. 11 and 12 are views illustrating fifth and sixth structures of the cell stack part including the radical unit, the first auxiliary unit and the second auxiliary unit according to the present invention.

Firstly, the cell stack part 100e may be defined as illustrated in FIG. 11. The cell stack part 100e includes the radical unit 110', the first auxiliary unit 130c and the second auxiliary unit 140c.

That is, the radical unit 110' may be defined by stacking the first electrode 111, the first separator 112, the second electrode and the second separator 114, in turn, from the lower side to the upper side. At this time, the first electrode 111 may be the cathode, and the second electrode 113 may be anode.

The first auxiliary unit 130c may be defined by stacking the separator 114, the anode 113, the separator 112 and the cathode 111, in turn, from the first terminal electrode 116, i.e., from the upper side in FIG. 8 to the lower side thereof. At this time, the cathode 111 of the first auxiliary unit 130c has the active material layer provided at only one surface thereof facing the radical unit 110'.

The second auxiliary unit 140c may be defined by stacking the cathode 111 (the first cathode), the separator 112, the anode 113, the separator 114 and the cathode 118 (the second cathode), in turn, from the second terminal separator 117, i.e., from the lower side in FIG. 11 to the upper side thereof. At this time, the cathode 118 (the second cathode) of the second auxiliary unit 140c, which is disposed at the outermost side, may have the active material layer provided at only one surface thereof facing the radical unit 110'. For reference, if the auxiliary unit includes the separator, it is advantageous to align the unit bodies.

Then, the cell stack part 100f may be defined as illustrated in FIG. 12. The cell stack part 100f includes the radical unit 110' and the first auxiliary unit 130d under the radical unit 110'.

The radical unit 110' may be defined by stacking the first electrode 111, the first separator 112, the second electrode 113 and the second separator 114, in turn, from the lower side to the upper side. At this time, the first electrode 111 may be the cathode, and the second electrode 113 may be anode.

And the first auxiliary unit 130d may be defined by stacking the separator 114, the anode 113 and the separator 112, in turn, from the first terminal electrode 116. At this time, the second auxiliary unit may not be provided. For reference, the anode may react with an aluminum layer of an electrode case (e.g., pouch) due to a potential difference. Therefore, the anode may be insulated from the electrode case through the separator.

Figure 13:
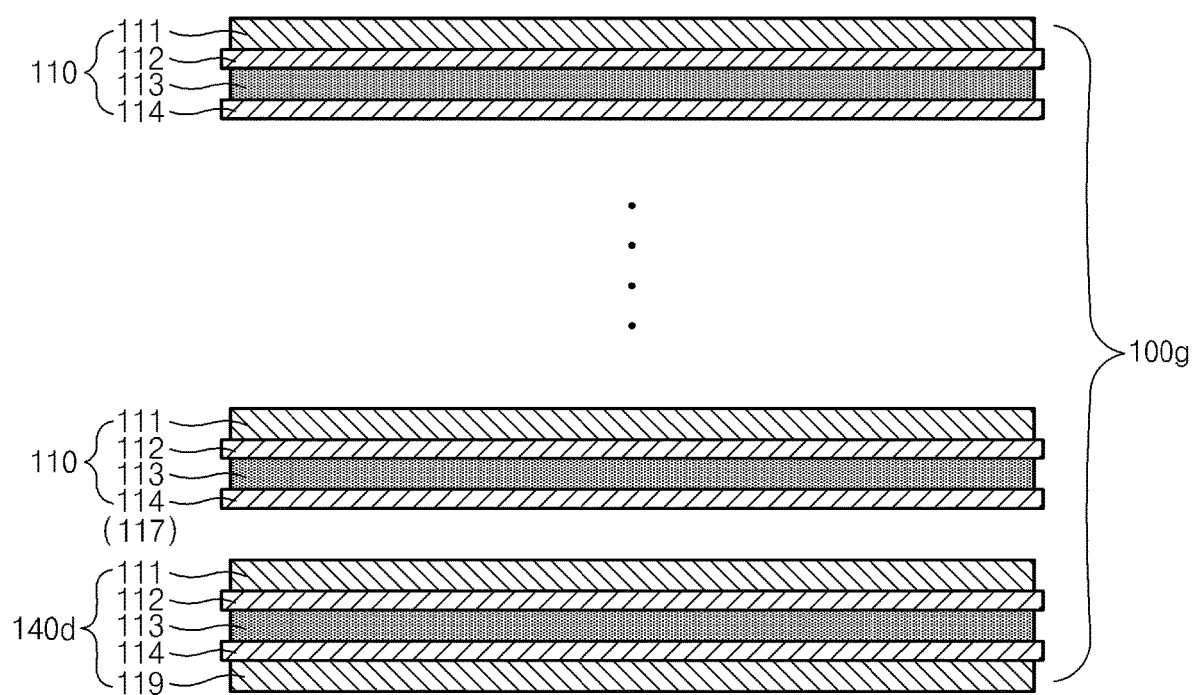
FIG. 13 is a side view illustrating a seventh structure of the cell stack part including the radical unit and the second auxiliary unit according to the present invention.

FIG. 13 is a side view illustrating a seventh structure of the cell stack part including the radical unit and the second auxiliary unit according to the present invention.

Lastly, the cell stack part 100g may be defined as illustrated in FIG. 13. The cell stack part 100g includes the radical unit 110 and the second auxiliary unit 140d under the radical unit 110.

The radical unit 110 may be defined by stacking the first electrode 111, the first separator 112, the second electrode 113 and the second separator 114 from the upper side to the lower side. At this time, the first electrode 111 may be the anode, and the second electrode 113 may be the cathode.

And the second auxiliary unit 140d may be defined by stacking the anode 111, the separator 112, the cathode 113, the separator 114 and the anode 119 in turn, from the second terminal separator 117. At this time, the first auxiliary unit may not be provided.

Meanwhile, in the present invention, the case, in which lengths or sizes of the anode lead and the cathode lead are the same, is described as an example. However, the present invention is not limited thereto and the lengths or the sizes thereof may be different.

While this invention has been particularly shown and described with reference to preferred embodiments thereof and drawings, it will be understood by those skilled in the art that various changes in form and details may be made therein without departing from the spirit and scope of the invention as defined by the appended claims.

What is claimed is:

1. An electrode assembly for a polymer secondary battery cell, comprising:
    a cell stack part defined by stacking at least one radical unit having a four-layered structure in which a first electrode, a first separator, a second electrode and a second separator are repeatedly stacked in turn,
    wherein each of the first electrode and the second electrode has a width or a length corresponding to 99.7% to 100% of a width or a length of the first separator or the second separator, respectively, and thus is aligned to be coincided with or close to an end of the first separator or the second separator,
    wherein at least one of the first electrode and the second electrode is defined so that one of a width and a length thereof is the same as that of the first separator or the second separator and the other of the width and the length thereof is smaller than that of the first separator or the second separator,
    wherein each of the first electrodes are made from a same first electrode material, and wherein each of the second electrodes are made from a same second electrode material, respectively,
    wherein a coating material is coated on both surfaces of the first separator facing the first and second electrodes, and also coated on both surfaces of the second separator, and
    wherein the cell stack part is defined by stacking two or more radical units, and the radical units are adhered to each other by the coating material.

2. The electrode assembly of claim 1, wherein the radical unit is defined by adhering the electrodes and the separators.

3. The electrode assembly of claim 2, wherein the adhering of the electrodes and the separators is an adhering process in which pressure is applied to the electrodes and the separators, or another adhering process in which pressure and heat are applied to the electrodes and the separators.

4. The electrode assembly of claim 1, wherein the coating material is a mixture of inorganic particles and a binder polymer.

5. The electrode assembly of claim 1, wherein the radical unit is defined by repeatedly stacking the four-layered structure.

6. The electrode assembly of claim 1, wherein the cell stack part further comprises a first auxiliary unit which is stacked on a first terminal electrode as the first electrode disposed at the uppermost side or the lowermost side thereof, and
    when the first electrode is a cathode and the second electrode is an anode, the first auxiliary unit is defined by stacking the separator, the anode, the separator and the cathode in turn from the first terminal electrode, and when the first electrode is the anode and the second electrode is the cathode, the first auxiliary unit is defined by stacking the separator and the cathode in turn from the first terminal electrode.

7. The electrode assembly of claim 6, wherein the cathode of the first auxiliary unit comprises a collector and an active material coated on only one surface of the collector facing the radical unit.

8. The electrode assembly of claim 1, wherein the cell stack part further comprises a first auxiliary unit which is stacked on a first terminal electrode as the first electrode disposed at the uppermost side or the lowermost side thereof, and
    when the first electrode is a cathode and the second electrode is an anode, the first auxiliary unit is defined by stacking the separator, the anode and the separator in turn from the first terminal electrode.

9. The electrode assembly of claim 1, wherein the cell stack part further comprises a second auxiliary unit which is stacked on a second terminal separator as the second separator disposed at the uppermost side or the lowermost side thereof, and
    when the first electrode is a cathode and the second electrode is an anode, the second auxiliary unit is defined as the cathode, and when the first electrode is the anode and the second electrode is the cathode, the second auxiliary unit is defined by stacking the anode, the separator and the cathode in turn from the second terminal separator.

10. The electrode assembly of claim 9, wherein the cathode of the second auxiliary unit comprises a collector and an active material coated on only one surface of the collector facing the radical unit.

11. The electrode assembly of claim 1, wherein the cell stack part further comprises a second auxiliary unit which is stacked on a second terminal separator as the second separator disposed at the uppermost side or the lowermost side thereof, and
    when the first electrode is a cathode and the second electrode is an anode, the second auxiliary unit is defined by stacking a first cathode, the separator, the anode, the separator and a second cathode in turn from the second terminal separator, and
    the second cathode of the second auxiliary unit comprises a collector and an active material coated on only one surface of the collector facing the radical unit.

12. The electrode assembly of claim 1, wherein the cell stack part further comprises a second auxiliary unit which is stacked on a second terminal separator as the second separator disposed at the uppermost side or the lowermost side thereof, and
    when the first electrode is an anode and the second electrode is a cathode, the second auxiliary unit is defined by stacking the anode, the separator, the cathode, the separator and the anode in turn from the second terminal separator.

13. The electrode assembly according to claim 1, wherein the first and second separators are not joined to each other along any common edge.

* * * * *